(12) United States Patent
Christoffer et al.

(10) Patent No.: US 9,133,894 B2
(45) Date of Patent: Sep. 15, 2015

(54) SYNCHRONIZING RING AND GEAR CHANGING TRANSMISSION FOR A VEHICLE

(75) Inventors: Ulf Christoffer, Bremen (DE); Marcus Spreckels, Oyten (DE)

(73) Assignee: Oerlikon Friction Systems (Germany) GmbH, Bremen (DE)

( * ) Notice: Subject to any disclaimer, the term of this patent is extended or adjusted under 35 U.S.C. 154(b) by 1276 days.

(21) Appl. No.: 12/485,985

(22) Filed: Jun. 17, 2009

(65) Prior Publication Data

US 2009/0314599 A1 Dec. 24, 2009

(30) Foreign Application Priority Data

Jun. 18, 2008 (EP) ..................................... 08158459

(51) Int. Cl.
*F16D 23/04* (2006.01)
*F16D 23/02* (2006.01)

(52) U.S. Cl.
CPC .................................... *F16D 23/025* (2013.01)

(58) Field of Classification Search
CPC .................................................... F16D 23/025
USPC .............. 192/53.34, 53.341, 53.342, 53.343; 29/893.33
See application file for complete search history.

(56) References Cited

U.S. PATENT DOCUMENTS

| | | | |
|---|---|---|---|
| 4,597,484 A * | 7/1986 | Takiguchi et al. | 192/107 M |
| 4,742,723 A * | 5/1988 | Lanzerath et al. | 74/339 |
| 4,866,831 A | 9/1989 | Lanzerath et al. | |
| 4,998,445 A * | 3/1991 | Fujiwara | 74/339 |
| 5,105,927 A * | 4/1992 | Frost | 192/53.31 |
| 6,065,579 A * | 5/2000 | Nels | 192/107 M |
| 6,547,052 B1 | 4/2003 | Schwuger et al. | |
| 8,286,776 B2 * | 10/2012 | Doernhoefer et al. | 192/107 R |
| 2008/0067026 A1 * | 3/2008 | Spreckels | 192/53.34 |
| 2008/0149450 A1 * | 6/2008 | Christoffer et al. | 192/53.34 |
| 2011/0056793 A1 | 3/2011 | Dörnhöfer et al. | |

FOREIGN PATENT DOCUMENTS

| | | |
|---|---|---|
| DE | 3519811 A1 | 12/1986 |
| DE | 19853856 A | 5/2000 |
| EP | 0821175 A | 1/1998 |
| EP | 1900955 | 3/2008 |
| EP | 1900955 A | 3/2008 |
| GB | 2357815 A | 7/2001 |
| JP | 2005074502 A | 3/2005 |
| JP | 2005155703 A | 6/2005 |
| JP | 5578834 B1 | 11/2010 |
| WO | WO 2007068432 A1 * | 6/2007 |

OTHER PUBLICATIONS

European Search Report for Patent Application 08158459.1, Nov. 17, 2008.

* cited by examiner

*Primary Examiner* — Robert Hodge
*Assistant Examiner* — Terry Chau
(74) *Attorney, Agent, or Firm* — Robert S. Green

(57) ABSTRACT

The invention relates to a synchronizing ring for a synchronization device of a gear changing transmission, wherein a guiding element extends in a region between an outer surface of the means providing security against rotation and the outer installation surface in the circumferential direction (U) with respect to a distance from the axial synchronizing ring axis.

15 Claims, 7 Drawing Sheets

SYNCHRONIZING RING AND GEAR CHANGING TRANSMISSION FOR A VEHICLE

CROSS-REFERENCE TO RELATED APPLICATIONS

Figure 1:
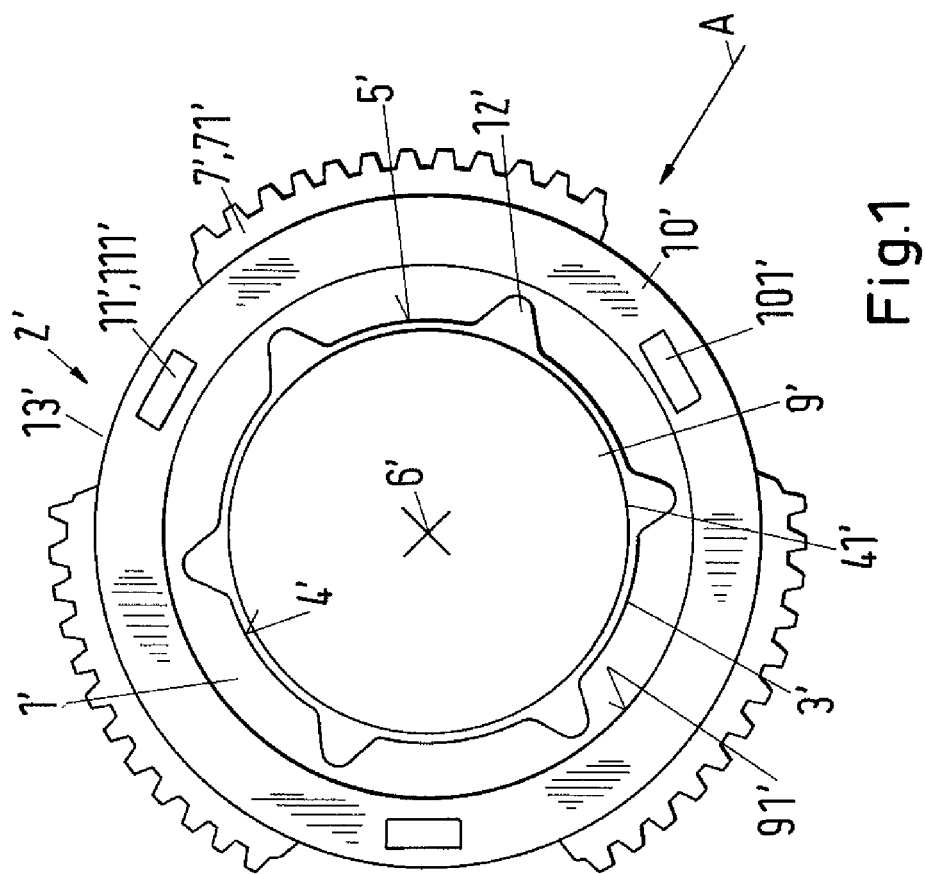

The present application claims priority under 35 U.S.C. §119 of European Patent Application No. 08158459.1 filed on Jun. 18, 2008, the disclosure of which is expressly incorporated by reference herein in its entirety.

The present invention relates to a synchronizing ring for a synchronizing device of a switchable gear changing transmission, as well as a gear changing transmission for a vehicle according to the preamble of the independent claims 1 and 13.

Synchronizing rings in a mechanical switchable gear changing transmission, for example in vehicle gearboxes, are used to match the relative speeds between the transmission shaft and the gear wheel during a change of gear. The synchronization is achieved by friction between the corresponding friction partners. The manner of operation and the course of the synchronization process of such transmissions are known per se, and do not need to be further explained to the person of ordinary skill in the art here.

To prevent premature wear and/or to improve the friction characteristic it is known to apply a friction coating to the friction surfaces of synchronizing rings, which are typically made of metal or metal alloys, such as brass or steel. Several very different types of coatings are used, for example, thermal spray coatings consisting of molybdenum, carbon friction layers or friction coatings of other materials.

In DE 35 19811 A1 a carrier for a conical synchronizing ring is described, this has an outer toothed ring divided into three and is arranged in a cylindrical cavity of a synchronizing ring hub, often described as a Synchronizing ring body. It is essentially rotationally fixedly anchored to the synchronizing ring hub via abutments formed as lugs. In the context of this invention essentially rotationally fixedly anchored means that, the synchronizing ring is rotationally fixedly connected to the synchronizing ring hub apart from small angular deflections in the circumferential direction.

DE 198 53 856 A1, describes an improved version of the synchronizing ring described above. The synchronizing ring of DE 198 53 856 A1 is characterized in that its width is essentially only determined by the width of its friction surface. This is achieved, in that an abutment which functionally corresponds to the lugs of DE 35 19811 A1, is arranged at or near to an end section of the ring body with a smaller cone diameter and also in that, in the radial direction, the contour of the abutment projects beyond the contour of the outer jacket surface of the ring body.

Both synchronizing rings are in principle secured well against turning with respect to the synchronizing ring hub via the lugs or abutments in the operational state; however, both lack a reliable guide in the radial direction in the cylindrical cavity in the synchronizing ring hub.

This means, that the synchronizing rings known in the prior art are indeed secured against turning in the circumferential direction with reference to the synchronizing ring hub; however, these rings tend to uncontrolled movements due to their conical outer surface which interacts with a cylindrical inner contact surface of the cylindrical cavity of the synchronizing ring hub, for example small radial deviations or tilting movements, which can lead to unpleasant vibrations, negatively influencing the reliability and accuracy of the synchronization process, leading to an increase in the switching time, to faster and increased wear of the friction surface and of the overall synchronizing ring as such. This, leads to shorter repair and maintenance intervals, totally irrespective of the fact that the ease of shifting and drive comfort of a motor vehicle are significantly restricted due to the poor guidance of the synchronizing ring in the cavity of the synchronization hub and the resultant uncontrolled movements. These effects become far more significant, the more power i.e. torque has to be switched through such a transmission.

The main problem of manufacturing synchronizing rings from shaped sheet metal is that it is not possible to manufacture a cylindrical outer surface as a conical friction surface has to be produced during the shaping process. So far the problem has been defused to greater or less extent. An attempt was, for example, made to improve the guidance of the synchronizing ring in the cylindrical cavity of the synchronizing ring hub, for example by trying to match the conical outer side of the friction surface to the synchronizing ring hub, by thickening or by the bending over of additional lugs. However, these known solutions have considerable drawbacks, for example, with regard to the manufacturing and even more significantly with respect to the stiffness of the synchronizing rings.

A significant improvement was already suggested by the applicant in EP 1 900955 A1.

This invention relates to a synchronizing ring for a synchronization device of a switchable gear changing transmission in which, to fix the synchronizing ring in a cylindrical cavity of a synchronizing ring hub, a means providing security against rotation is provided, which is integrally connected to the ring body and extends from the gear wheel surface of the ring body in the direction towards the hub surface. To guide the installation surface in the cavity of the synchronizing ring hub a guiding element is provided at the ring body in a predeterminable region between the gear wheel surface and the hub surface.

Important for this invention is that a guiding element is provided at the ring body for supporting and/or centering and guiding the installation surface at an inner surface of the cylindrical cavity of the synchronizing ring hub, in a predeterminable region between the gear wheel surface and the hub surface, the guide element preferably being made available in the shape of several bulges distributed over the installation surface in the circumferential direction.

Figure 2:
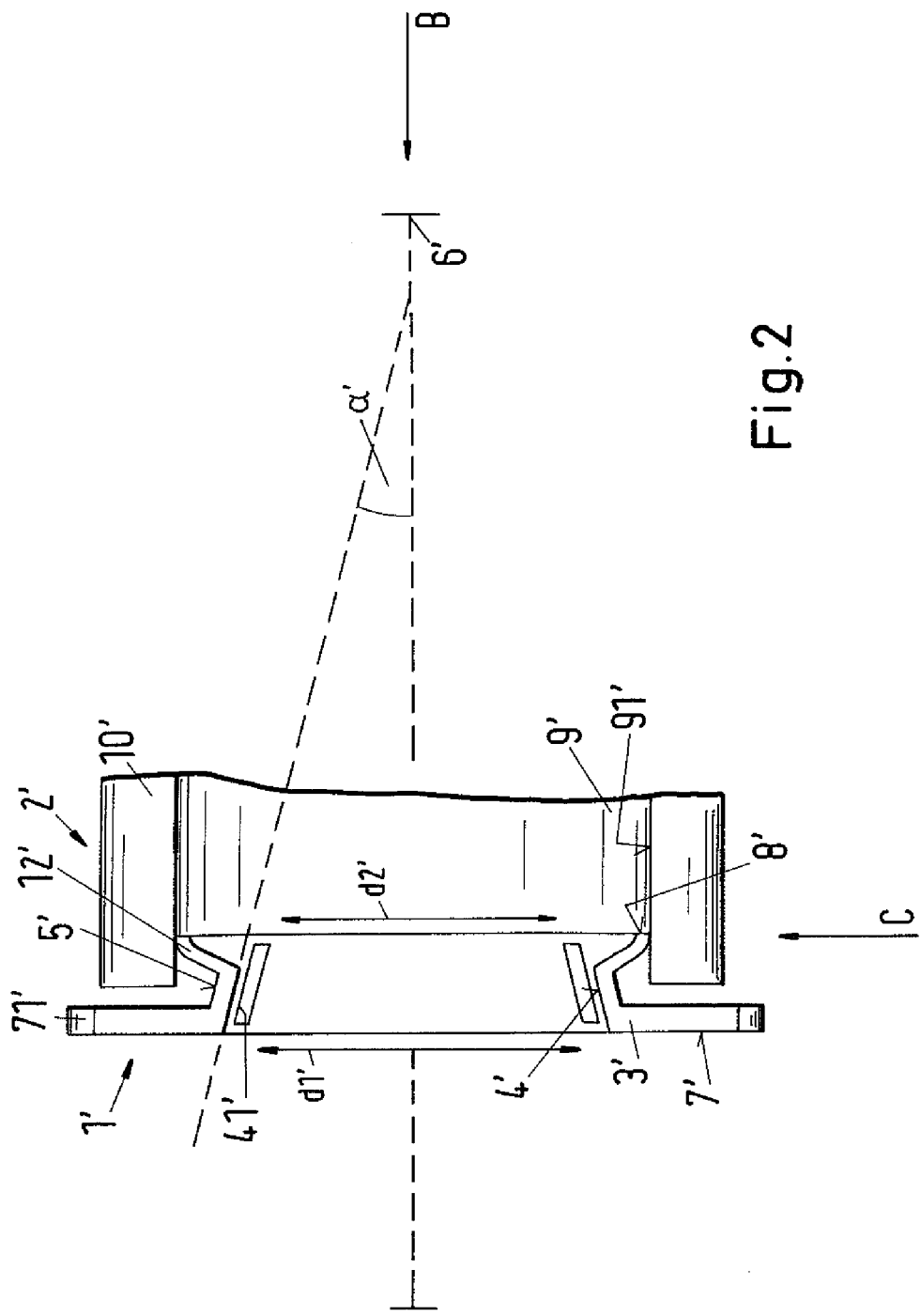

By way of explanation a simple embodiment of the synchronizing ring known from EP 1 900 955 is shown in FIG. 1. FIG. 2 shows the installed synchronizing ring of FIG. 1.

For a better distinction between the present invention and the prior art, the reference numerals in FIGS. 1 and 2 which show the prior art are marked with an apostrophe, while the reference numerals of FIG. 3 to FIG. 7, showing examples in accordance with the invention but have no apostrophes.

The known synchronizing ring 1' of FIG. 1 incorporates a conical ring body 3' with an inner friction surface 4' with a carbon friction coating 41' and a outer installation surface 5', respectively bounding the ring body 3' in a radial circumferential direction. The outer installation surface 5' and the inner friction surface 4' essentially extend parallel to one another conically at a predefined angle $_3$, not shown in FIG. 1, along an axial synchronizing ring axis 6' of the synchronizing ring 1'.

In this design, the ring body 3' is essentially bounded in the axial direction at a largest cone diameter d1' by a gearwheel surface 7' with gear 71' extending perpendicular to the synchronizing ring axis 6' and at a smallest cone diameter d2' by a hub surface 8'. For fixing the synchronizing ring 1' in a cylindrical cavity 9' of a synchronizing ring hub 10', not depicted in FIG. 3, a means providing security against rotation 11' is provided and is integrally connected to the ring body 3' extending from the gear wheel surface 7' of the ring body 3' in the direction of the hub surface 8', a construction which has been known in principle from the prior art for a long time. In accordance with FIG. 1 the means providing security against rotation 11' is a securing lug 111' which can, for example be made by bending an initially radially outwardly protruding section of the ring body 3' initially in the direction toward the installation surface 5' during the manufacture of the synchronizing ring 1'.

This means that the means providing security against rotation 11' formed as a securing lug 111' extends on the side of the ring body 3' remote from the synchronizing ring axis 6', essentially aligned to the installation surface 5'.

The securing lug 111' is shaped and arranged with respect to the installation surface 5' in such a way, that the securing lug 111' can be anchored in a corresponding recess 101' of the synchronizing ring hub 10' in the fitted state.

To guide the installation surface 5' at an inner surface 91' of the cylindrical cavity 9' of the synchronizing hub 10', a guiding element 12' is provided at the ring body 3' in a predeterminable region between the gear wheel surface 7' and the hub surface 8', in the shape of an outward bulge 12' of the ring body 3' at the installation surface 5', with the bulge 12' protruding radially outwards from the synchronizing ring axis 6'.

This means that a significant feature of the known synchronizing ring 1' in accordance with EP 1 900955 A1 is to be seen in that the guiding element 12' is provided directly at the ring body 3' itself in the shape of a bulge 12', this means that the design of the guiding element 12' impairs and/or changes at least the geometry and possibly also the mechanical properties such as the stiffness and the strength of the known synchronizing ring 1'.

In the fitted state of the synchronizing ring 1' the bulges 12' then guide and centre the synchronizing ring 1' securely and reliably in the cylindrical cavity 9' provided in the synchronizing ring hub 10' for accommodation of the installation surface 5'.

For a better understanding of the cooperation of the synchronizing ring 1' and the synchronization hub 10', FIG. 2 shows a schematical side view of a synchronizing ring 1' in its fitted state in accordance with FIG. 1. The section is taken along the arrow A in accordance with FIG. 3 such that the securing lug 111' is not seen.

The inner friction surface 4' of the conical ring body 3', which in this present example has a carbon friction coating 41', and the outer installation surface 5' of the conical ring body 3', conically extend at the friction angle $\beta$ essentially parallel to one another about the axial synchronizing ring axis 6' of the synchronizing ring 1'.

The synchronizing ring 1' is centrally seated with the installation surface 5' in the cavity 9' of the synchronizing ring hub 10' via the guiding elements 12' which are provided as bulges 12'.

The gear wheel surface 7' with gear wheel 71' is situated outside of the synchronizing ring hub 10', so that the gear wheel 71' can enter into rotationally fixed engagement with a further gear not shown in FIG. 2, of another switchable gear changing transmission which is likewise not shown.

Although the synchronizing ring of EP 1 900 955 superbly solves the problems previously mentioned from the prior art, a certain need for improvement nevertheless exists. The synchronizing ring in accordance with EP 1 900 955 admittedly shows excellent running characteristics in the operating state, and is entirely stably guided in the synchronizing ring hub in the operating state.

However, the bulges distributed across the installation surfaces naturally reduce the friction area.

The object of the invention is therefore to provide an improved synchronizing ring, optimally guided in the synchronizing ring hub so that, in operation, no uncontrolled relative motions between the synchronizing ring and the synchronizing ring hub occur during and/or outside of a synchronization process. At the same time the conical friction surface should not be modified by bulges, thickened portions or the like. Furthermore, a corresponding improved gear changing transmission should be provided.

The subjects of the invention which satisfy these objects are characterized by the features of the independent claims.

The dependent claims relate to particularly advantageous embodiments of the invention.

The invention thus relates to a synchronizing ring for a synchronization device of a gear changing transmission, including a conical ring body with an inner friction surface and an outer installation surface, respectively bounding the ring body in a radial circumferential direction extending perpendicular to an axial synchronizing ring axis and extending conically at a predeterminable angle of friction about the axial synchronizing ring axis of the synchronizing ring. In this arrangement the ring body is bounded in the axial direction at a largest cone diameter by a gear wheel surface of a gear wheel extending substantially perpendicularly to the synchronizing ring axis and at a smallest cone diameter by a hub surface. For the fixing of the synchronizing ring in a cylindrical cavity of a synchronizing ring hub in an installed state, a means providing security against rotation is provided, which is integrally connected to the ring body and extends in a direction away from the gear wheel surface of the ring body. In accordance with the invention, for the guidance of the installation surface, a guiding element is provided in the cylindrical cavity at the means providing security against rotation.

It is important for the invention that a guiding element is provided at the means providing security against rotation, to support and/or centre and guide the installation surface at an inner surface of the cylindrical cavity of the synchronizing ring hub.

Due to the fact that the guiding elements are provided at the means providing security against rotation, a synchronizing ring in accordance with the invention is simultaneously excellently protected against turning with respect to the synchronizing ring hub by the means providing security against rotation, and is at the same time reliable. It is in particular guided and centred with respect to the radial direction in the cylindrical cavity of the synchronizing ring hub. In this the conical friction surface is in no way impaired by the guiding elements, as the guiding elements are provided at the means providing security against rotation away from the conical friction surface.

This means that a synchronizing ring in accordance with the invention no longer tends to uncontrolled movements, for example, to small radial deflections or tilting movements which, for example, lead to unpleasant vibrations as for the conical synchronization rings known from the prior art, due to its conical outer shape which interacts with a cylindrical inner contact surface in the cylindrical cavity of the synchronizing ring hub. At the same time the friction surface and the ring body are by no means impaired. This means the ring body maintains its full stability and the full conical friction surface is available for the synchronization process. In this the reliability and accuracy of the synchronization process is considerably positively influenced through the use of a synchronizing ring in accordance with the invention, which can lead to a reduction in switching times, reduces the wear on the friction surface and of the complete synchronizing ring as such and thus leads to longer repair and maintenance intervals, irrespective of the fact that the shifting ease and drive comfort of a vehicle are significantly increased due to the outstanding guidance of the synchronizing ring in accordance with the invention in the cavity of the synchronizing ring hub. These positive effects become far more significant, the more power i.e. torque has to be switched through a corresponding transmission.

In practice the guiding element is usually an integrated component of the means providing security against rotation and is formed with this means during the shaping process, for example, from sheet steel in the production process.

In a special embodiment the guiding element extends from the means providing security against rotation in the circumferential direction, and indeed preferably in two opposite directions, so that a relatively wide saddle region is obtained which guarantees the reliable guidance of the synchronizing ring in the cylindrical cavity of the synchronizing ring hub.

It is also possible that the guiding element asymmetrically extends from the means providing security against rotation in only one circumferential direction with, in particular, three means providing security against rotations each with a guiding element being provided. This means that it is also possible that the guiding element, which is in the form of a centering lug, is only provided on one side of the means providing security against rotation, which consequently reduces the cost and complexity of the design and the material requirements.

With a further specific embodiment the guiding element extends in the direction of the circumferential direction in a region between the means providing security against rotation and the outer installation surface.

It is also possible that the guiding element extends from the side of the means providing security against rotation remote from the gear wheel surface in the circumferential direction along the means providing security against rotation or, for example, that the means providing security against rotation is connected to the guiding element via a bridge and is provided at a holding lug.

The specific embodiment which is chosen for each specific application is determined, for example, by the mechanical loading in the operating state or by geometric specifications through the other parts of a transmission, for example, depending on the specific geometric design of the other parts of the transmission or on other specific boundary conditions.

It is important that the guiding elements are provided directly at the means providing security against rotation and not at the friction surface and at the ring body and are not constructed as separate lugs in complex manner.

In a special embodiment the gear wheel surface is interrupted by a recess, in particular by one, or two, or three or more than three recesses, and/or the means providing security against rotation is connected in the recess to the ring body.

In this connection, as many means providing security against rotation are provided as recesses are preferably, but not necessarily in the gear wheel surface. In an embodiment particularly important in practice exactly three means providing security against rotation are provided, which guarantee a maximum security against rotation and guidance through the guiding elements at a minimal design cost.

In particular the means providing security against rotation can be formed as a securing lug which extends remote from the synchronizing ring axis in substantially the same direction as the installation surface.

In a very specific embodiment the securing lug can be a securing lug with a pocket shaped recess, whereby an improved anchorage of the synchronizing ring to the synchronizing ring hub can be achieved in individual cases.

A wear reducing and/or friction optimized friction medium, in particular a friction coating, is preferably provided on or at the friction surface, specifically a molybdenum coating and/or a friction coating, in particular a carbon friction coating and/or a different friction medium.

It will be understood that in particular cases no friction coating need be provided on the friction surface, for example, when, but not only when, the synchronizing ring is part of a multiple cone synchronization device.

The synchronizing ring is designed as a shaped sheet metal part made from a deep drawing quality metal sheet and/or from a steel, preferably from C55 steel, C80 steel or C80M steel, in particular from C35 steel or C45 steel.

The invention further relates to a switchable gearbox transmission for a vehicle, in particular for a motor car, a van or a heavy goods vehicle with a synchronizing ring in accordance with any one of the preceding claims.

Figure 3:
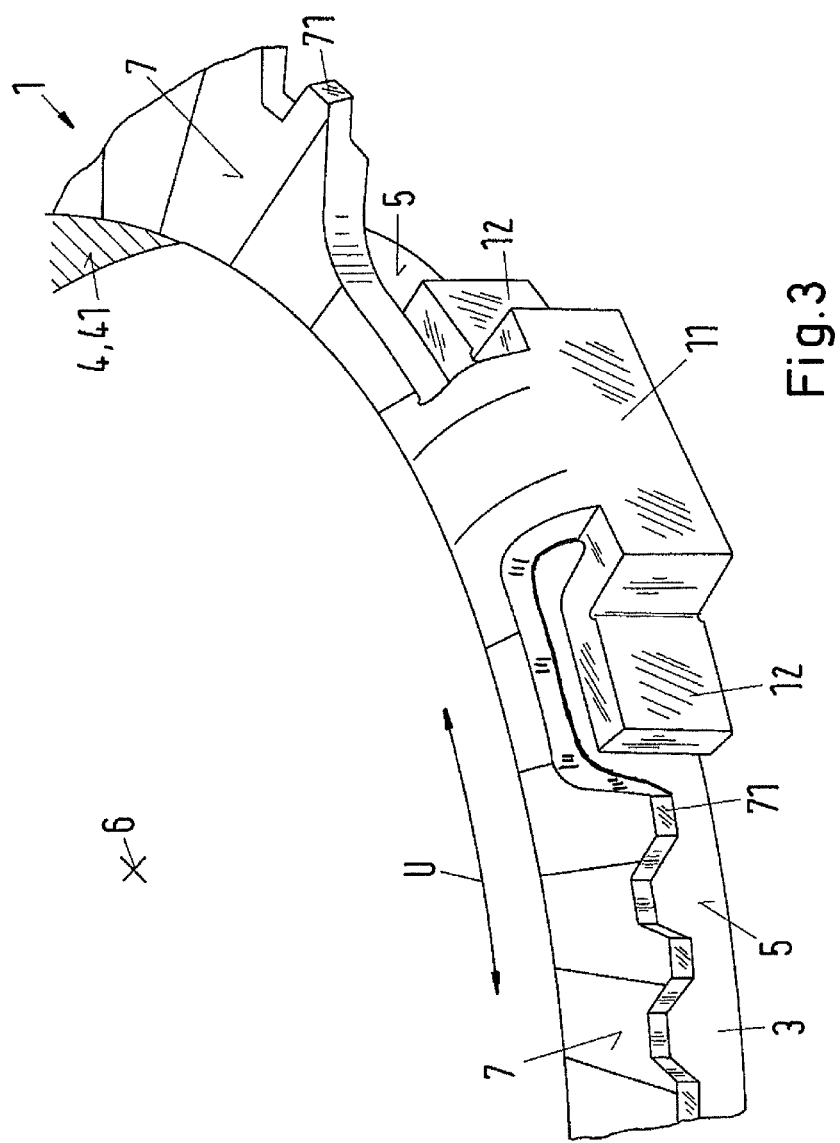
Figure 4:
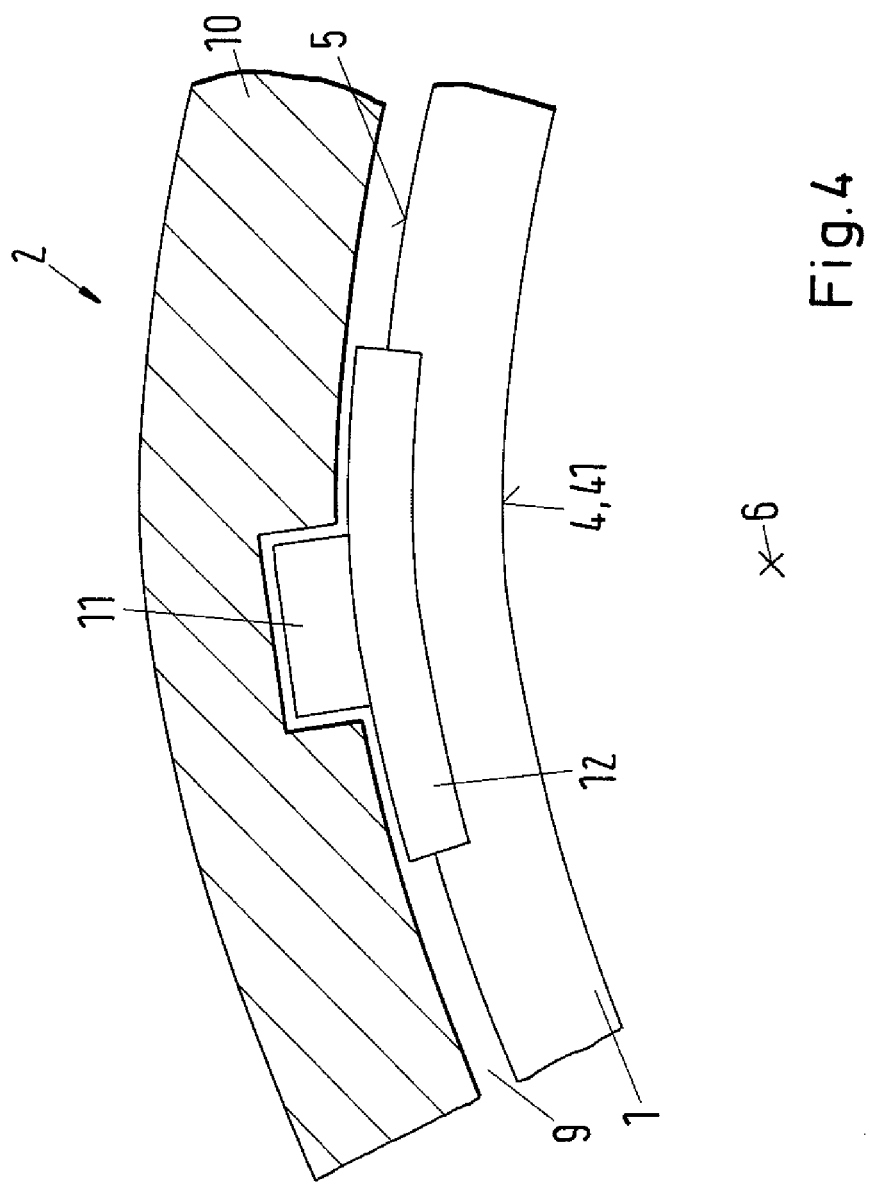
Figure 5:
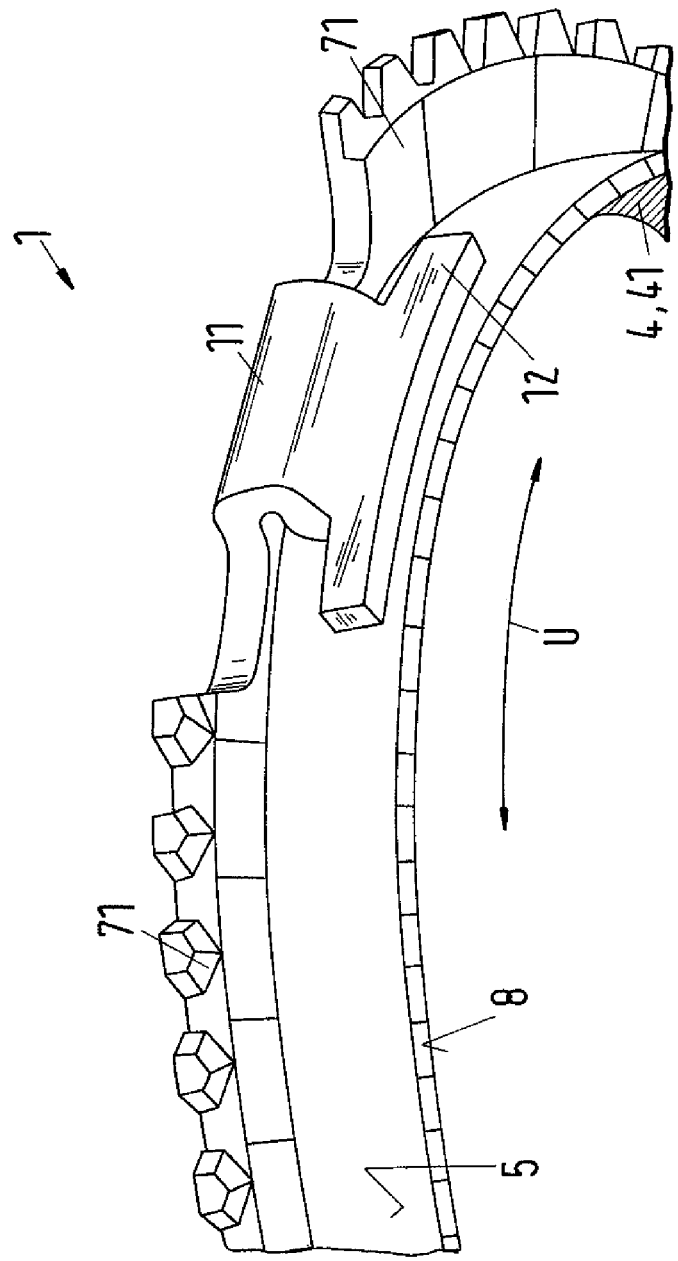
Figure 6:
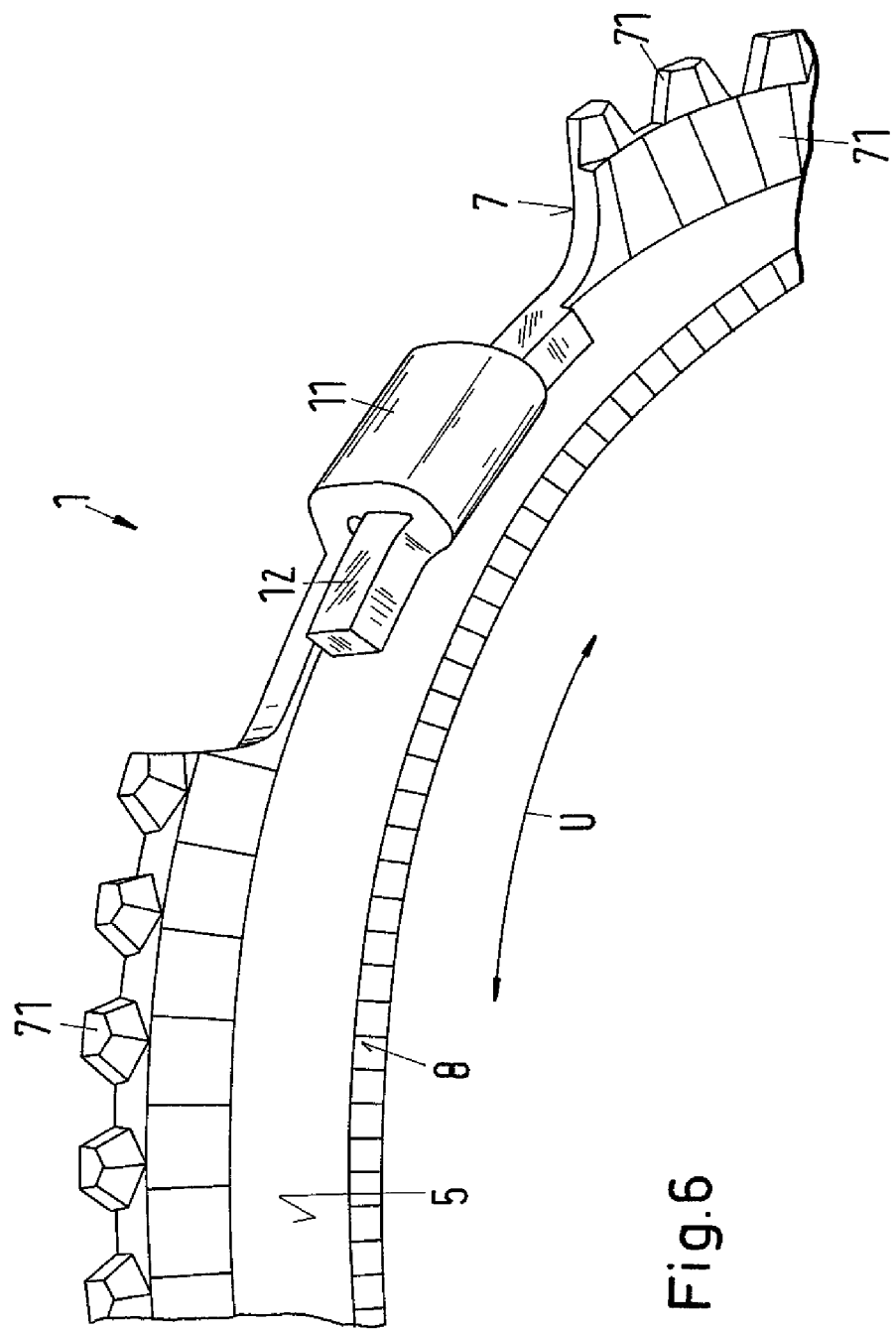
Figure 7:
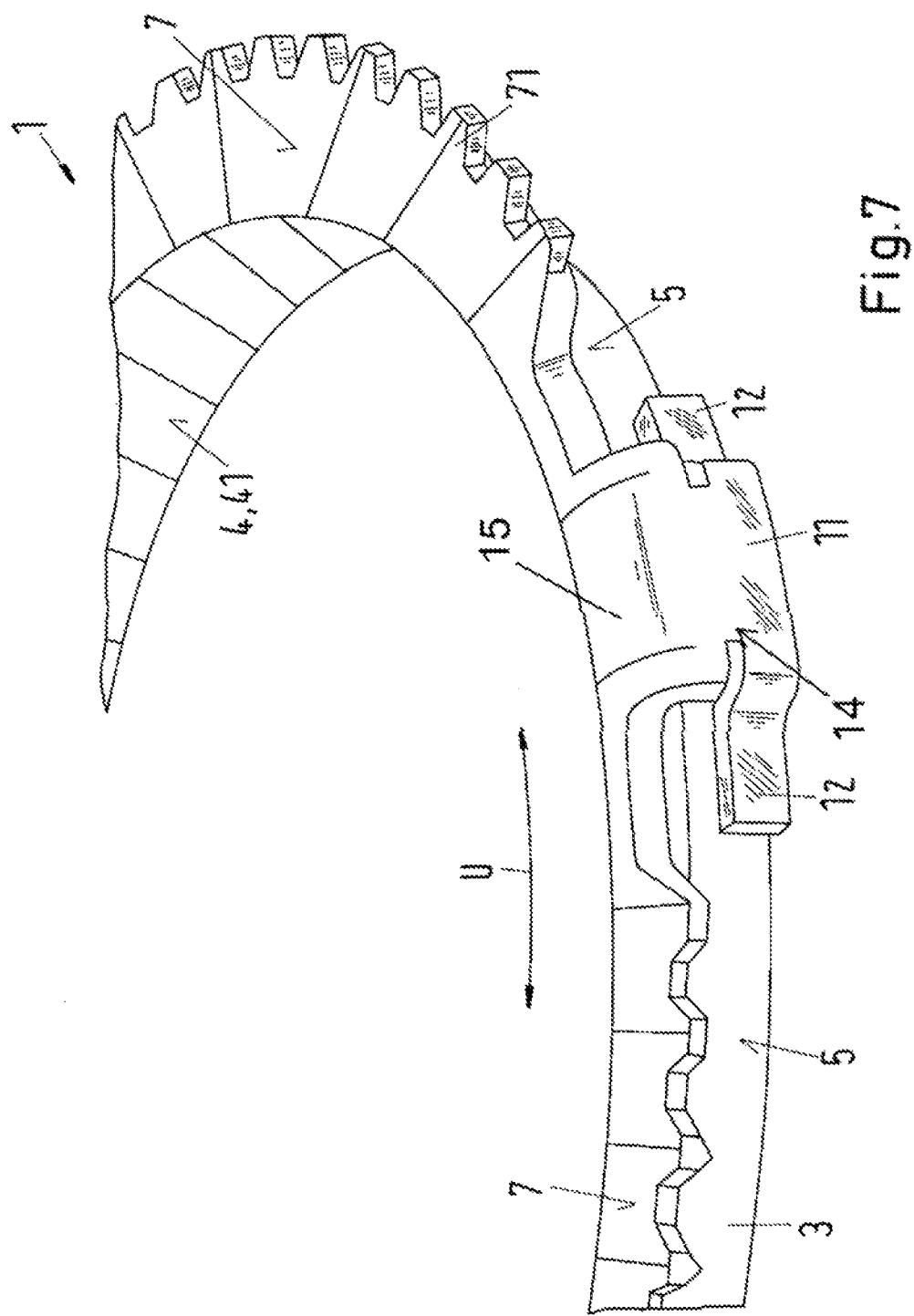

In the following the invention will be described in accordance with the schematic drawings. They show:

FIG. 1 a section of a synchronizing ring known from the prior art;

FIG. 2 a side view of a synchronizing ring in accordance with FIG. 1 in the installed state;

FIG. 3 a first embodiment of a synchronizing ring in accordance with the invention;

FIG. 4 the synchronizing ring of FIG. 3 in the installed state;

FIG. 5 a second embodiment of a synchronizing ring in accordance with the invention;

FIG. 6 a third embodiment of a synchronizing ring in accordance with the invention;

FIG. 7 a fourth embodiment of a synchronizing ring in accordance with the invention;

FIGS. 1 and 2 showing a synchronizing ring as known from the prior art, have already been discussed in detail above so that these Figures do not have to be discussed any more in the following.

FIG. 3 shows in a schematic representation a section of an embodiment of a synchronizing ring in accordance with the invention this will be described in the following in its entirety with the reference numeral 1. In this connection the same reference numerals refer to the same technically equivalent features in the different Figures or they refer to features with a technically equivalent function.

The synchronizing ring 1 of FIG. 3 comprises a conical ring body 3 with an inner friction surface 4 with a carbon friction coating 41 and an outer installation surface 5 which bound the ring body 3 in a radially circumferential direction in a manner known per se. The outer installation surface 5 and the inner friction surface 4 extend essentially in parallel to one another at a predefinable friction angle, which is not visible in FIG. 1, conically about an axial synchronizing ring axis 6, illustrated in FIG. 3 at a distance to the friction surface 4, which is not drawn to scale.

In this arrangement the ring body 3 is bounded in the axial direction at a largest cone diameter by a gear wheel surface 7 with a gear wheel 71 extending essentially perpendicular to the synchronizing ring axis 6 and at a smallest cone diameter by a hub surface 8, not visible in the perspective illustration of FIG. 3. To fix the synchronizing ring 1 in a cylindrical cavity 9 of a synchronizing ring hub 10, a means providing security against rotation 11 is provided, which is also not illustrated in FIG. 3, but is integrally connected to the ring body 3 and extends from the gear wheel surface 7 of the ring body 3 in the direction to the hub surface 8 a construction which is known in principle from the prior art. In this arrangement the means providing security against rotation 11 according to FIG. 3 is, for example, formed during the manufacture of the synchronizing ring 1 by bending an initially radially protruding section of the ring body 3 in the direction towards the installation surface 5.

This means that the means providing security against rotation 11 extends on the outer side of the ring body 3 remote from the synchronizing ring axis 6 in substantially the same direction parallel to the installation surface 5.

As will be discussed in more depth later with the aid of the figures the means providing security against rotation 11 is adapted and is arranged with respect to the installation surface such that the means providing security against rotation 11 can be anchored in the installed state in a corresponding recess 101 of the synchronizing ring hub 10.

In accordance with the invention a guiding element 12 is provided at the means providing security against rotation 11, to guide the installation surface 5 at an inner surface 91 of the cylindrical cavity 9 of the synchronizing ring hub 10. As mentioned before this is not shown in FIG. 3, since FIG. 3 does not show the synchronizing ring 1 in the installed state. In this arrangement the guiding element 12 is an integral component of the means providing security against rotation 11 and extends, starting at the means providing security against rotation 11, in the circumferential direction U in two opposite directions.

In the installed state of the synchronizing ring 1, the guiding element in accordance with the invention centres and guides the synchronizing ring 1 securely and reliably in the cylindrical cavity 9 provided in the synchronizing ring hub 10 for the reception of the installation surface 5.

In FIG. 4 a side view of the synchronizing ring 1 according to FIG. 3 in the installed state is schematically illustrated. The sectional plane illustrated in FIG. 4 thereby lies perpendicular to the synchronizing ring axis 6, which is drawn in at a distance not true to scale.

The inner friction surface 4 of the conical ring body 3, which in the present example includes a carbon friction coating 41 and the outer installation surface 5 of the conical ring body 3, extend at the angle of friction conically and essentially parallel to one another around the synchronizing ring axis 6 of the synchronizing ring 1.

The synchronizing ring 1 is centrally mounted with the installation surface 5 in the cavity 9 of the synchronizing ring hub 10 via the guiding elements 12 in accordance with the invention which are provided at the means providing security against rotation 11.

For reasons of straightforwardness the gear wheel surface 7 with a gear wheel 71 which is not illustrated in FIG. 4, is located outside of the synchronizing ring hub 10 in a manner known per se so that the gear wheel 71 can enter into rotationally fixed engagement with a further gearwheel, which is also not shown in FIG. 4, of a likewise not shown switchable gear changing transmission.

In FIG. 5 to FIG. 7 three further specific embodiments of synchronizing rings in accordance with the invention are schematically shown which, in each case, differ from each other and from the specific embodiment of FIG. 3 only through the specific arrangement of the guiding element 12 at the means providing security against rotation 11.

In the specific example of FIG. 5 the guiding element 12 extends at a side of the means providing security against rotation 11 remote from the gear wheel surface 7 along the means providing security against rotation 11 in the circumferential direction U. Through this a larger surface for the support of the synchronizing ring 1 in the synchronizing ring hub 10 is available in comparison, for example, into the synchronizing rings 1 of FIGS. 3, 6 and 7. One will always choose a synchronizing ring 1 in accordance with FIG. 5 when specific cases require a particularly large support surface, for the support of the synchronizing ring 1 in the synchronizing ring hub 10.

In the embodiment in accordance with FIG. 6 the guiding element 12 extends in a region between the means providing security against rotation 11 and the outer installation surface 5 in the circumferential direction U. It is thus arranged between the means providing security against rotation 11 and the installation surface 12. The example of FIG. 6 is thus a variant which is a particularly space saving embodiment in the axial direction towards the synchronizing ring hub 10.

In accordance with FIG. 7 a very special variation of a synchronizing ring 10 in accordance with the invention is illustrated in which, the means providing security against rotation 11 with the guiding element 12 is provided via a bridge 14 at a holding lug 15. This type of construction provides the guiding element with a certain elasticity under pressure loading in the radial direction, so that the synchronizing ring 1 can run very smoothly and securely, for example, while being subjected to time dependently varying strains in a radial direction.

It is self explanatory that all embodiments explicitly discussed in this application are only exemplary for the invention and in particular that all suitable combinations, which can advantageously be used for specific applications, and all developments evident to the person of ordinary skill in the art are covered by this invention.

The invention claimed is:

1. A synchronizing ring for a synchronization device (2) of a gear changing transmission, including a conical ring body (3) with an inner friction surface (4) and an outer installation surface (5) bounding the ring body (3) in a radial circumferential direction (U), extending perpendicular to an axial synchronizing ring axis (6) and extending conically at a predefinable angle of friction about the axial synchronizing ring axis (6) of the synchronizing ring, wherein the ring body (3) is bounded in the axial direction at a largest cone diameter by a gear wheel surface (7) with a gear wheel (71) extending substantially perpendicularly to the synchronizing ring axis (6) and at a smallest cone diameter by a hub surface (8) and wherein, for the fixing of the synchronizing ring in a cylindrical cavity (9) of a synchronizing ring hub (10) in an installed state, means providing security against rotation (11) is provided, which is integrally connected to the ring body (3) and extends in a direction away from the gear wheel surface (7) of the ring body (3), characterized in that for the guidance of the installation surface (5) in the cylindrical cavity (9) a guiding element (12) is provided at the means providing security against rotation (11), and wherein the guiding element (12) extends starting from the means providing security against rotation (11) in the circumferential direction (U); and wherein the guiding element (12) extends in the circumferential direction (U) in a region between an outer surface of the means providing security against rotation (11) and the outer installation surface (5) with respect to a distance from the axial synchronizing ring axis (6); wherein the radially outer surface of the means providing security against rotation (11) has a greater radial distance from the axial synchronizing ring axis (6) than the guiding element (12).

2. A synchronizing ring in accordance with claim 1, wherein the guiding element (12) is an integral part of the means providing security against rotation (11).

3. A synchronizing ring in accordance with claim 1, wherein the guiding element (12) extends starting from the means providing security against rotation (11) in the circumferential direction (U), with in particular three means providing security against rotation (11) being provided, each with a respective guiding element (12).

4. A synchronizing ring in accordance with claim 1, wherein the guiding element (12) extends at a side of the means providing security against rotation (11) remote from the gear wheel surface (7) along the means providing security against rotation (11) in the circumferential direction (U).

5. A synchronizing ring in accordance with claim 1, wherein the means providing security against rotation (11) with the guiding element (12) is provided via a bridge (14) at a holding lug (15).

6. A synchronizing ring in accordance with claim 1, wherein the gear wheel surface (7) is interrupted by a recess (13), in particular by one, or two or three, or more than three recesses (13) and for the means providing security against rotation (11) is connected in the recess (13) to the ring body.

7. A synchronizing ring in accordance with claim 1, wherein as many means providing security against rotation (11) as recesses (13) are provided in the gear wheel surface (7).

8. A synchronizing ring in accordance with claim 1, wherein the means providing security against rotation (11) is formed as a securing lug (111), which extends on the outer side of the ring body (3) remote from the synchronizing ring axis (6) in substantially the same direction parallel to the installation surface (5).

9. A synchronizing ring in accordance with claim 8, wherein the securing lug (111) is a securing lug (1110) with a pocket like recess.

10. A synchronizing ring in accordance with claim 1, wherein no friction coating (41) is provided on the friction surface (4) and the synchronizing ring is in particular a part of a multi-cone synchronization device.

11. A synchronizing ring in accordance with claim 1 wherein a wear reducing and or a friction optimized friction medium (41), in particular a friction coating (41), specifically a molybdenum coating (41) and/or a friction layer (41), in particular a carbon friction layer (41) and/or a different friction medium (41) is provided on the friction surface (4).

12. A synchronizing ring in accordance with claim 1, wherein the synchronizing ring is a shaped sheet metal part formed from a deep drawing quality metal sheet.

13. A gear changing transmission for a vehicle, in particular for an automobile, a van or a heavy goods vehicle with a synchronizing ring (1) in accordance with claim 1.

14. A synchronizing ring in accordance with claim 12, wherein the metal sheet is steel.

15. A synchronizing ring in accordance with claim 14, wherein the steel is at least one of C35 steel, C45 steel, C55 steel, C80 steel and C80M steel.

\* \* \* \* \*